(12) United States Patent
Ubechel

(10) Patent No.: US 10,820,727 B2
(45) Date of Patent: Nov. 3, 2020

(54) METHODS AND SYSTEMS OF AN ILLUMINATED BASE MOUNTED FRAMING SYSTEM

(71) Applicant: Norion Michael Ubechel, Fremantle (AU)

(72) Inventor: Norion Michael Ubechel, Fremantle (AU)

( * ) Notice: Subject to any disclaimer, the term of this patent is extended or adjusted under 35 U.S.C. 154(b) by 0 days.

(21) Appl. No.: 16/458,185

(22) Filed: Jun. 30, 2019

(65) Prior Publication Data

US 2020/0154911 A1    May 21, 2020

Related U.S. Application Data

(60) Provisional application No. 62/694,798, filed on Jul. 6, 2018.

(51) Int. Cl.
*A47G 1/06*      (2006.01)
*F21V 8/00*      (2006.01)
(Continued)

(52) U.S. Cl.
CPC ......... *A47G 1/0622* (2013.01); *A47G 1/0616* (2013.01); *A47G 1/0638* (2013.01);
(Continued)

(58) Field of Classification Search
CPC .. A47G 1/0622; A47G 1/0638; A47G 1/0616; A47G 1/14; A47G 2001/148
(Continued)

(56) References Cited

U.S. PATENT DOCUMENTS 5,915,855 A * 6/1999 Murase ................. G02B 6/001
                                                                    40/546
8,141,284 B2 * 3/2012 Yang ................... A47G 1/0622
                                                                    40/737
(Continued)

FOREIGN PATENT DOCUMENTS

FR    2863093 A1 *    6/2005    ........... A47G 1/0622
GB    2149657 A *     6/1985    ........... A47G 1/0622
(Continued)

*Primary Examiner* — Kyle R Grabowski

(57) ABSTRACT

In one aspect, a back-lit digital photograph frame system is provided. A display assembly includes: a tray frame comprising a back surface of the display assembly as a backside enclosure; an optical acrylic block comprising a front surface of the display assembly; a light guide plate, wherein the light guide plate is located between a photographic print and a reflective backing paper, the photographic print, wherein the photographic print is located between optical acrylic block and the light guide plate, and a reflective backing paper, wherein the reflective back paper is located between the light guide plate and the tray frame, wherein the tray frame, the optical acrylic block, the light guide plate, the photographic print and the reflective backing paper are set in a vertical stack, and a base mount comprising an opening that receives the display assembly and holds the display assembly in a vertical position orthogonal to a receiving surface of the base mount, wherein the display assembly is held in place with a compression fit, and wherein the base mount further comprises a light emitting diode (LED) strip.

13 Claims, 15 Drawing Sheets

(51) Int. Cl.
*G09F 13/04* (2006.01)
*G09F 13/18* (2006.01)
*G09F 13/14* (2006.01)
*A47G 1/14* (2006.01)

(52) U.S. Cl.
CPC ......... *G02B 6/0055* (2013.01); *G02B 6/0088* (2013.01); *G09F 13/0413* (2013.01); *G09F 13/14* (2013.01); *G09F 13/18* (2013.01); *A47G 2001/148* (2013.01); *G09F 2013/049* (2013.01); *G09F 2013/147* (2013.01); *G09F 2013/1845* (2013.01)

(58) Field of Classification Search
USPC ............................................ 40/714–716, 764
See application file for complete search history.

(56) References Cited

U.S. PATENT DOCUMENTS

2005/0117330 A1\* 6/2005 Chen .................... A47G 1/0622
 362/125
2008/0163529 A1\* 7/2008 Beeman .................. G09F 13/14
 40/714

FOREIGN PATENT DOCUMENTS

KR 20130003354 U \* 6/2013
KR 20190056485 A \* 5/2019
WO WO-2005016081 A1 \* 2/2005 ........... A47G 1/0622

\* cited by examiner

```
┌─────────────────────────────────────────────────────┐
│  DONGBU LUMISHEET SITS WITHIN METAL TRAY AND BOTTOM │
│  PLUG SYSTEM CLICKS TOGETHER INTO A STURDY AND      │
│  UPRIGHT SYSTEM                                     │
│                      1202                           │
└─────────────────────────────────────────────────────┘
                          │
                          ▼
┌─────────────────────────────────────────────────────┐
│  ONCE LIGHT GUIDE PLATE, REFLECTIVE BACKING AND TRAY│
│  FRAME ARE COMBINED, THEY CAN BE FIXED TO THE BASE  │
│                      1204                           │
└─────────────────────────────────────────────────────┘
                          │
                          ▼
┌─────────────────────────────────────────────────────┐
│  ASSEMBLED SYSTEM SLIPS DOWNWARD INTO A ROUTED      │
│  OPENING WITH ROUNDED CORNERS                       │
│                      1206                           │
└─────────────────────────────────────────────────────┘
```

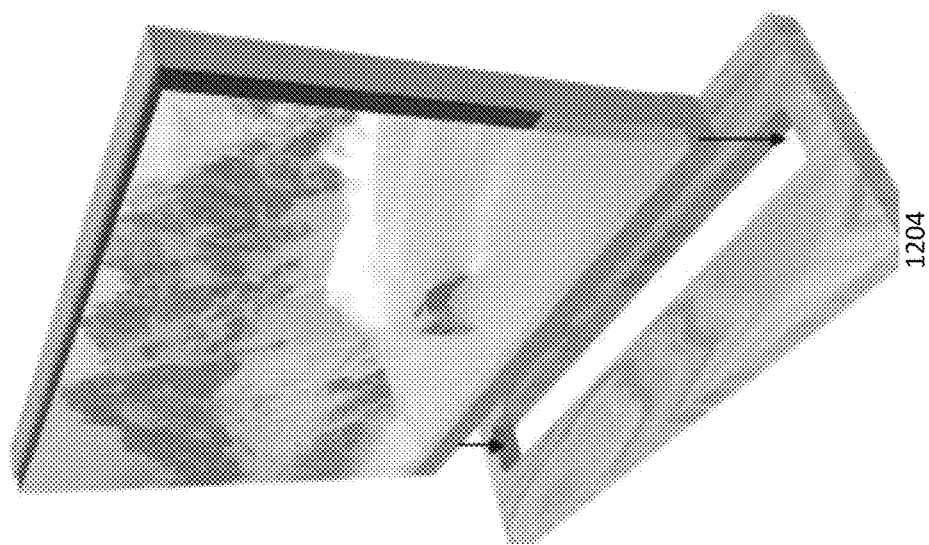
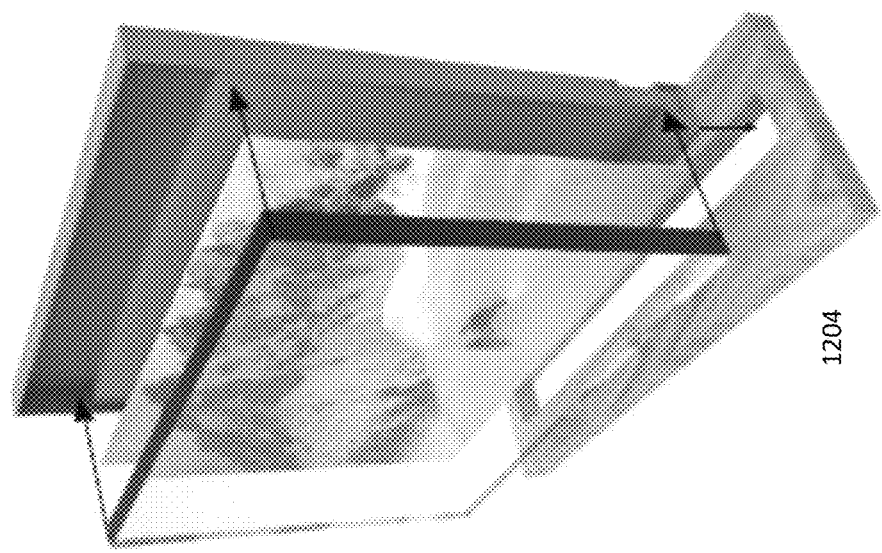
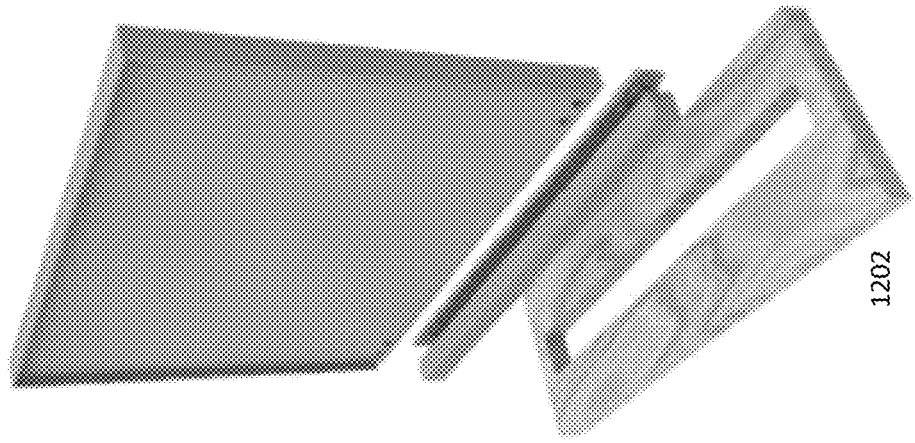
FIGURE 13

METHODS AND SYSTEMS OF AN ILLUMINATED BASE MOUNTED FRAMING SYSTEM

CROSS-REFERENCE TO RELATED APPLICATIONS

This application claims priority to U.S. provisional patent application No. 62/694,798, titled METHODS AND SYSTEMS OF AN ILLUMINATED BASE MOUNTED FRAMING SYSTEM and filed on 6 Jul. 2018. This application is hereby incorporated by reference in its entirety.

BACKGROUND

1. Field

This application relates generally to physical display devices, and more particularly to a system, method and article of an illuminated base mounted framing system.

2. Related Art

Users may wish to display photographs in an aesthetically pleasing manner. At the same time, users may wish to display photographs in an illuminated manner. Current photograph display systems may require difficult disassembly to replace photographs. Accordingly, additionally, repeated disassembly and assembly can cause wear and tear to display devices. Accordingly, improvements to the systems for the illuminated display of photographs are desired.

SUMMARY OF INVENTION

In one aspect, a back-lit digital photograph frame system is provided. A display assembly includes: a tray frame comprising a back surface of the display assembly as a backside enclosure; an optical acrylic block comprising a front surface of the display assembly; a light guide plate, wherein the light guide plate is located between a photographic print and a reflective backing paper, the photographic print, wherein the photographic print is located between optical acrylic block and the light guide plate, and a reflective backing paper, wherein the reflective back paper is located between the light guide plate and the tray frame, wherein the tray frame, the optical acrylic block, the light guide plate, the photographic print and the reflective backing paper are set in a vertical stack, and a base mount comprising an opening that receives the display assembly and holds the display assembly in a vertical position orthogonal to a receiving surface of the base mount, wherein the display assembly in place with a compression fit, and wherein the base mount further comprises a light emitting diode (LED) strip.

BRIEF DESCRIPTION OF THE DRAWINGS

FIG. 12 illustrates an alternative example process for image compression insertion with a BASELAMP, according to some embodiments.

FIG. 13 illustrates an example representation of process 1200, according to some embodiments.

Figure 1:
FIG. 1 illustrates an example back-lit photograph frame designed, according to some embodiments.

The Figures described above are a representative set, and are not an exhaustive with respect to embodying the invention.

DESCRIPTION

Disclosed are a system, method, and article of an illuminated base mounted framing system. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

BLUETOOTH is a wireless technology standard for exchanging data over short distances (using short-wavelength UHF radio waves in the ISM band from 2.4 to 2.485 GHz[3]) from fixed and mobile devices, and building personal area networks (PANs).

Cloud computing can involve deploying groups of remote servers and/or software networks that allow centralized data storage and online access to computer services or resources. These groups of remote serves and/or software networks can be a collection of remote computing services.

Qi standard is an open interface standard that defines wireless power transfer using inductive charging over distances (e.g. of up to 4 cm (1.6 inches)).

Polymethyl methacrylate (PMMA) is a transparent thermoplastic often used in sheet form as a lightweight or shatter-resistant alternative to glass.

Smart speaker is a type of wireless speaker and voice command device with an integrated virtual assistant (artificial intelligence) that offers interactive actions and handsfree activation with the help of one or more hot words.

Universal Serial Bus (USB) is an industry standard that was developed to define cables, connectors and protocols for connection, communication, and power supply between personal computers and their peripheral devices.

Exemplary Systems

FIG. 1 illustrates an example back-lit photograph frame designed (hereafter referred to as BASELAMP), according to some embodiments. BASELAMP can showcase printed images by mounting said images against a diamond polished optical block. BASELAMP can utilized efficient and color balanced LED's to back light high definition photographic quality prints. It is noted that BASELAMP can be a scalable framing system. In one example, BASELAMP can display images without a frame. In another example, BASELAMP can provide multiple functions. For example, BASELAMP can include various rich features such as, inter alia: ambient light sensors, built in audio systems, motion-detection systems and audio sensors, smart speakers with virtual assistant(s) (e.g. AMAZON ALEXA, etc.), USB systems, Qi wireless charging, BLUETOOTH controls, etc.

Figure 2:
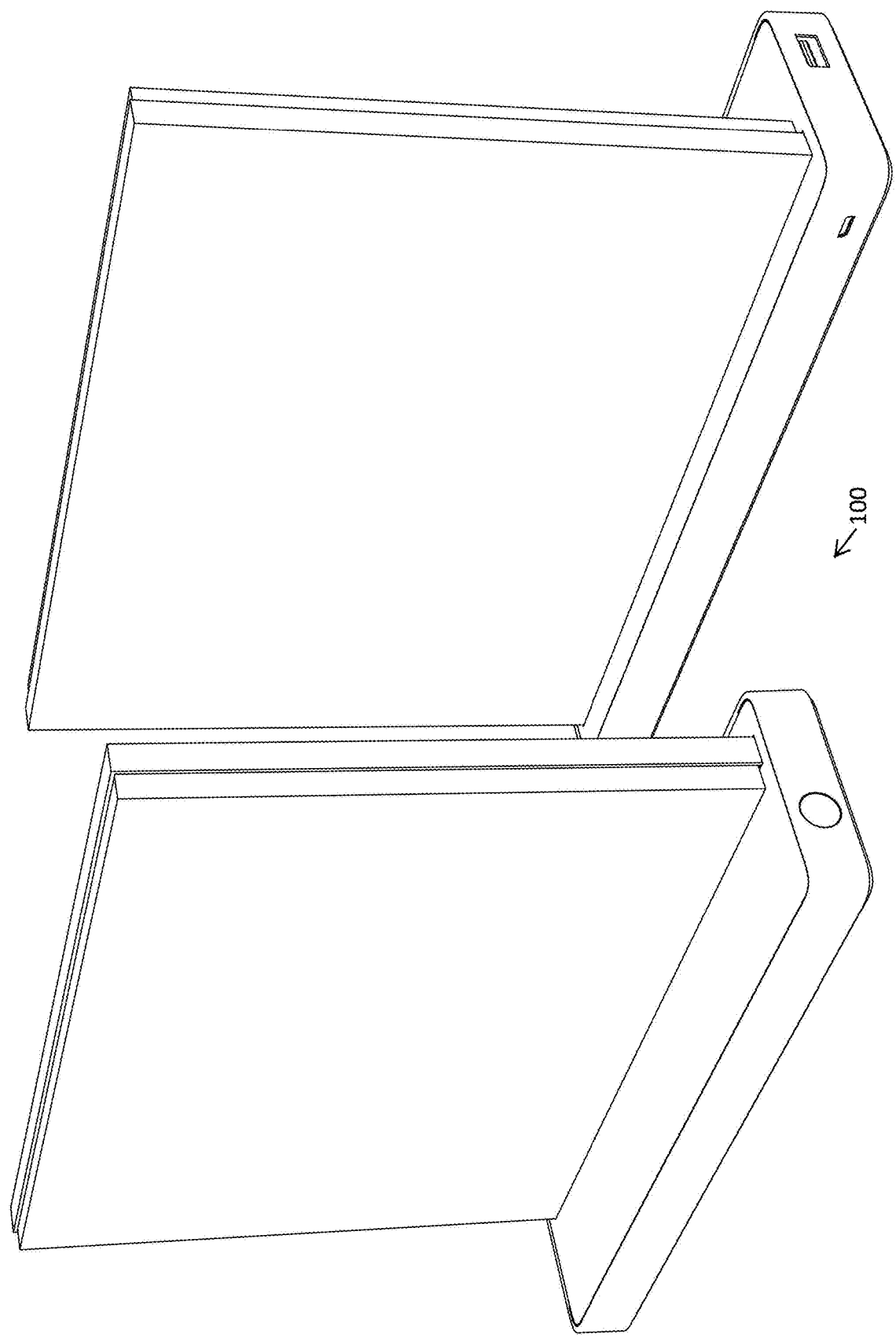
FIG. 2 is a perspective view of the illuminated base mounted framing system of the present invention.
Figure 3:
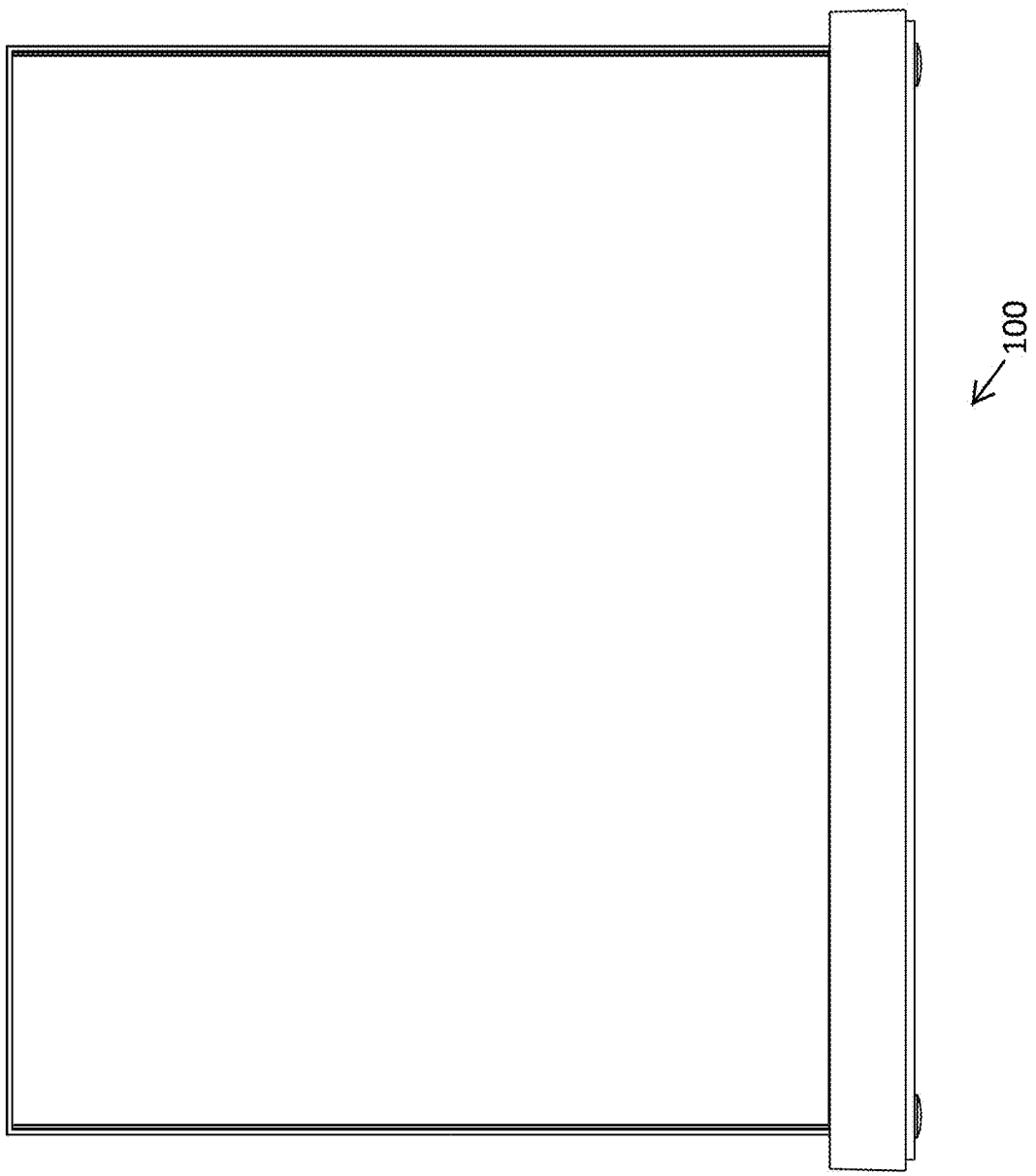
FIG. 3 is a front view of the illuminated base mounted framing system of the present invention.
Figure 4:
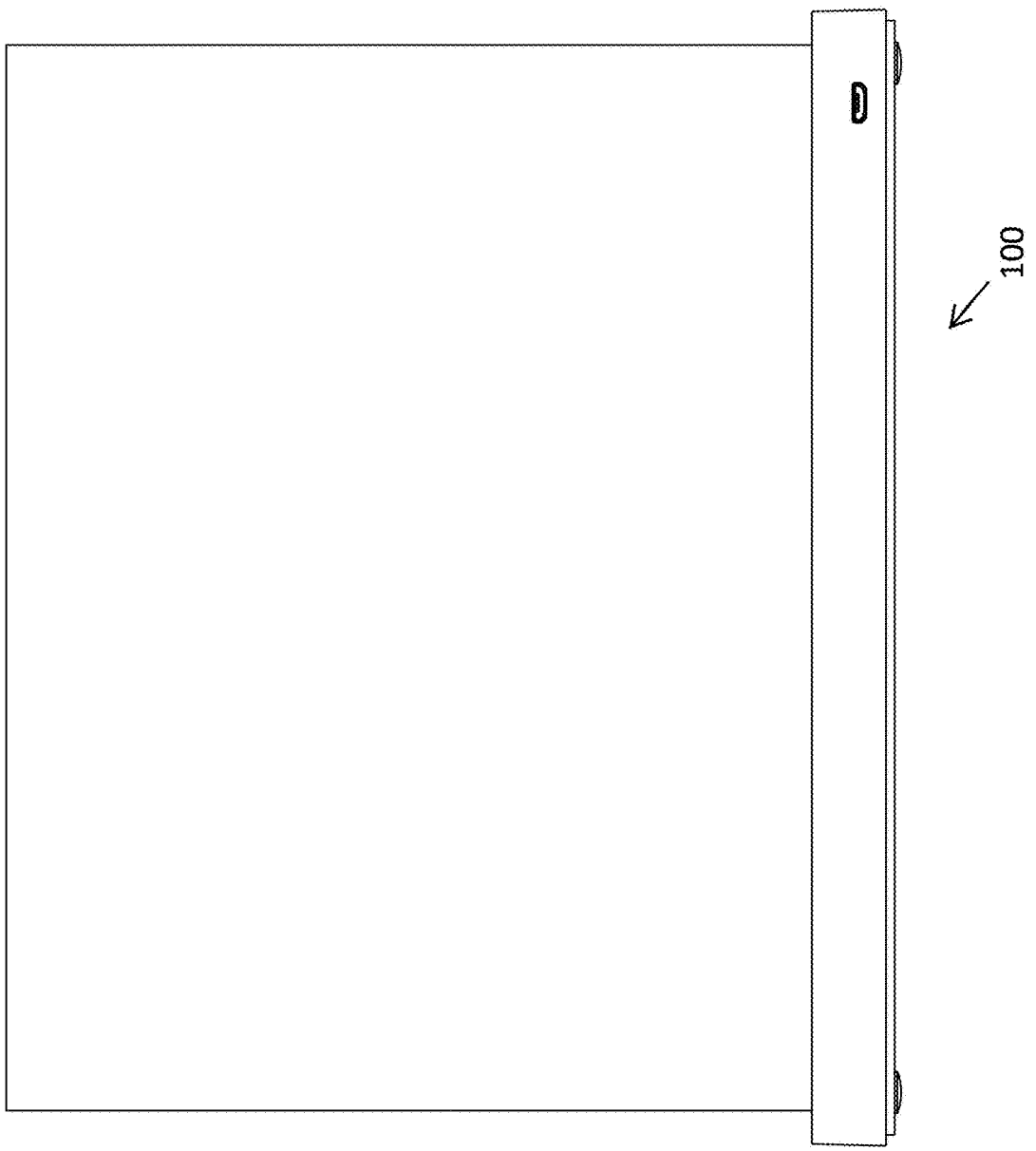
FIG. 4 is a back view of the illuminated base mounted framing system of the present invention.
Figure 5:
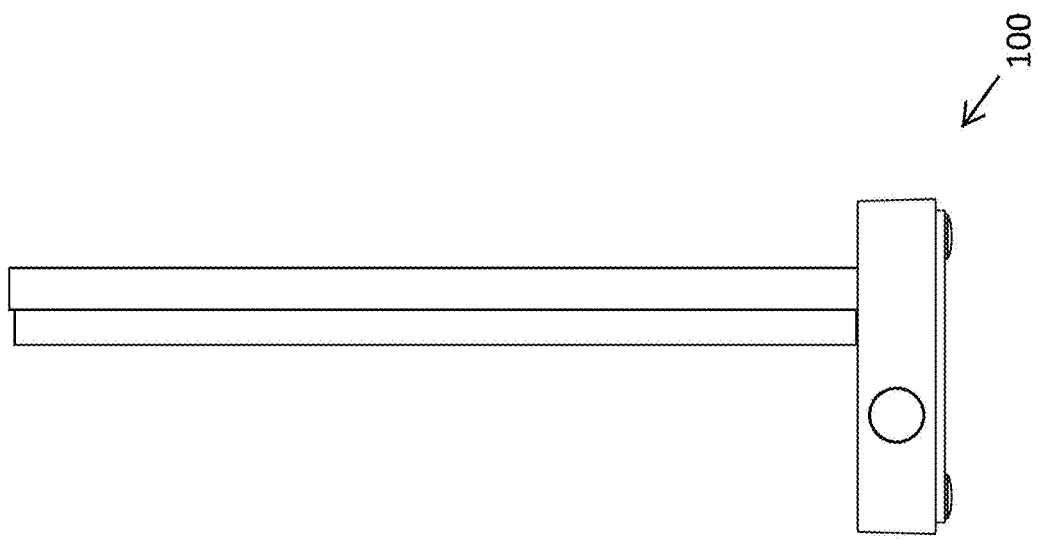
FIG. 5 is a side view of the illuminated base mounted framing system of the present invention.
Figure 6:
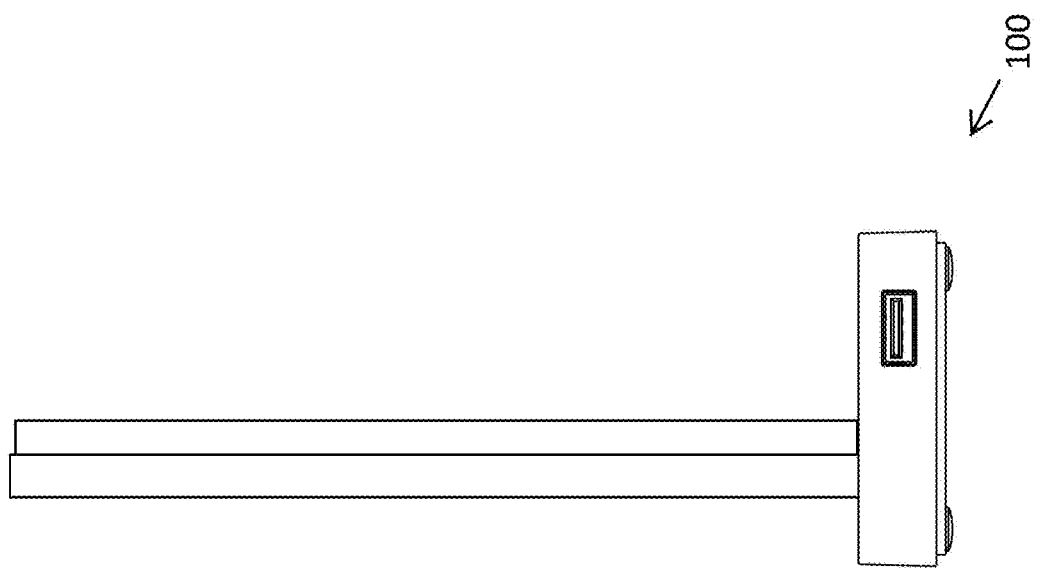
FIG. 6 is another side view of the illuminated base mounted framing system of the present invention.
Figure 7:
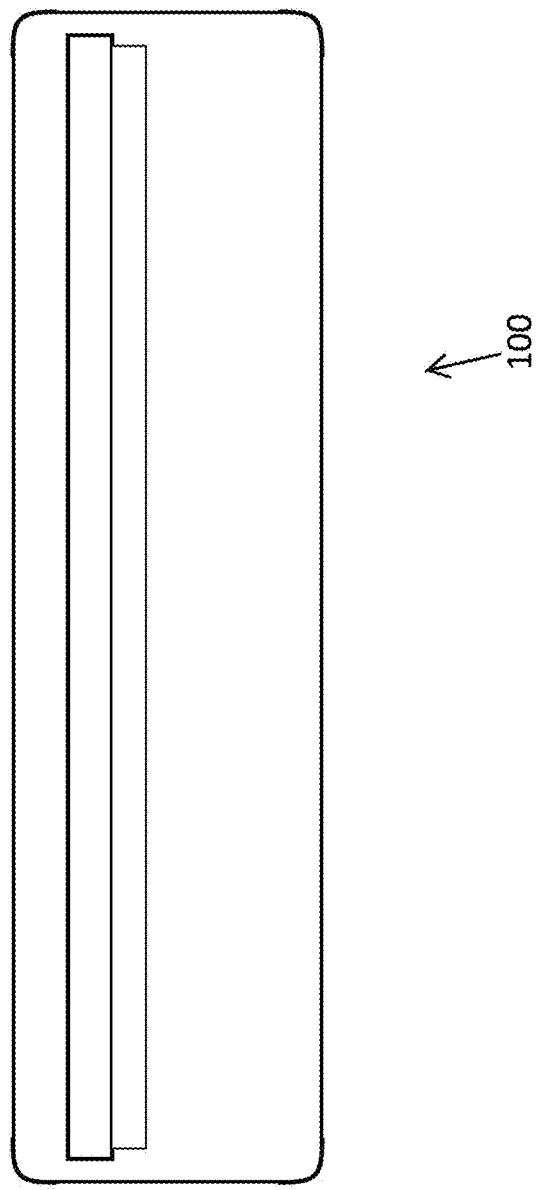
FIG. 7 is a top view of the illuminated base mounted framing system of the present invention.
Figure 8:
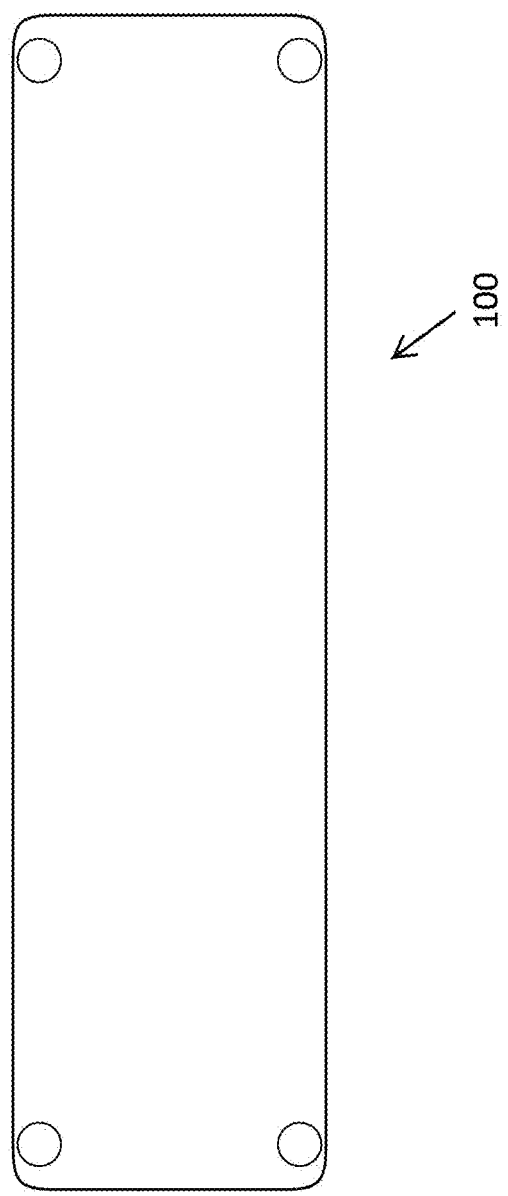
FIG. 8 is bottom view of the illuminated base mounted framing system of the present invention.

FIGS. 2-8 illustrate an example set of view of an illuminated base mounted framing system, according to some embodiments. FIG. 2 is a perspective view of the illuminated base mounted framing system of the present invention. FIG. 3 is a front view of the illuminated base mounted framing system of the present invention. FIG. 4 is a back view of the illuminated base mounted framing system of the present invention. FIG. 5 is a side view of the illuminated base mounted framing system of the present invention. FIG. 6 is another side view of the illuminated base mounted framing system of the present invention. FIG. 7 is a top view of the illuminated base mounted framing system of the present invention. FIG. 8 is bottom view of the illuminated base mounted framing system of the present invention.

Figure 9:
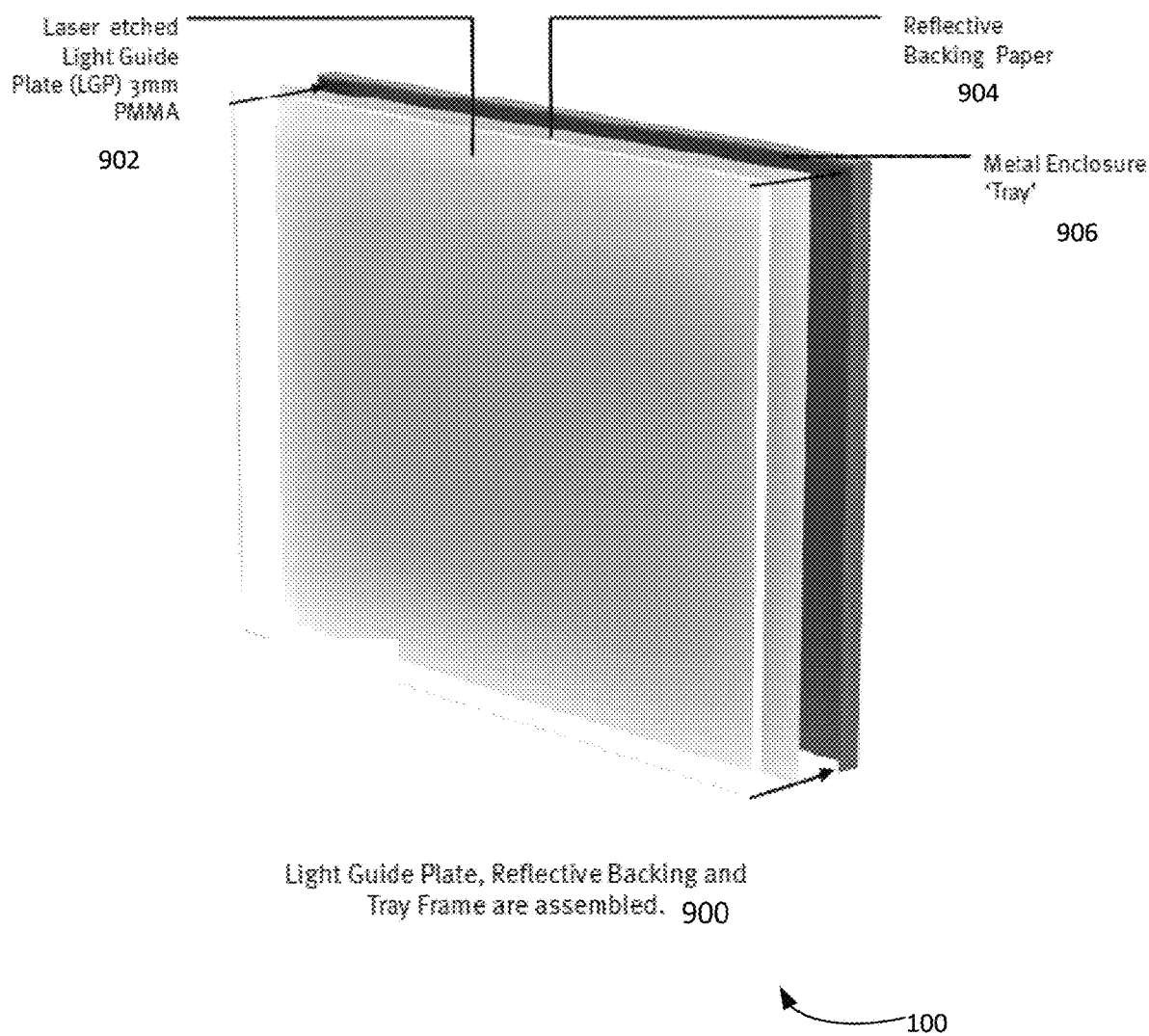
FIG. 9 and FIG. 10 illustrate an example exploded view of an example BASELAMP assembly, according to some embodiments.
Figure 10:
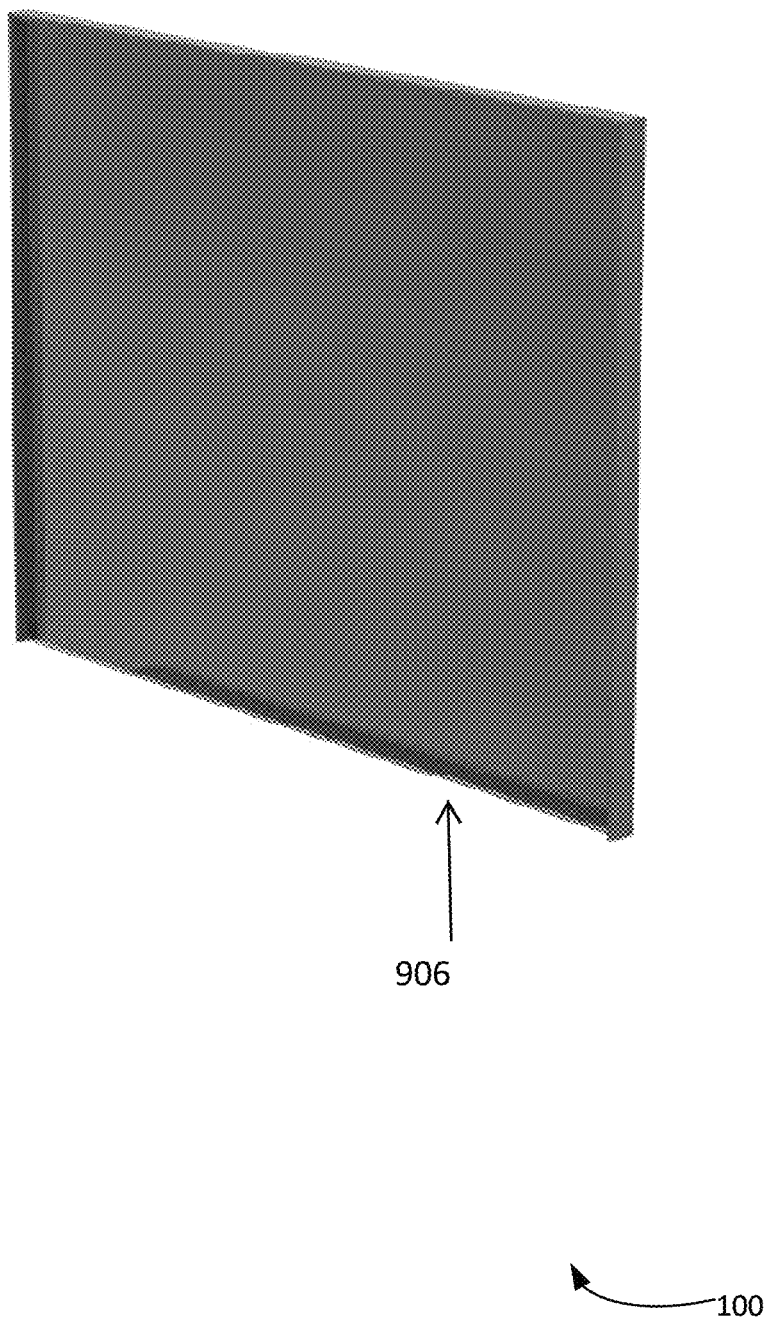

FIG. 9 and FIG. 10 illustrate an example exploded view of an example BASELAMP assembly 900, according to some embodiments. BASELAMP 100 includes a light guide plate 902, a reflective backing 904 and tray frame 906 that can be assembled as illustrated. In step 604, once the light guide plate, reflective backing and tray frame are combined, they can be fixed to the base in an BASELAMP assembly 100.

Figure 11:
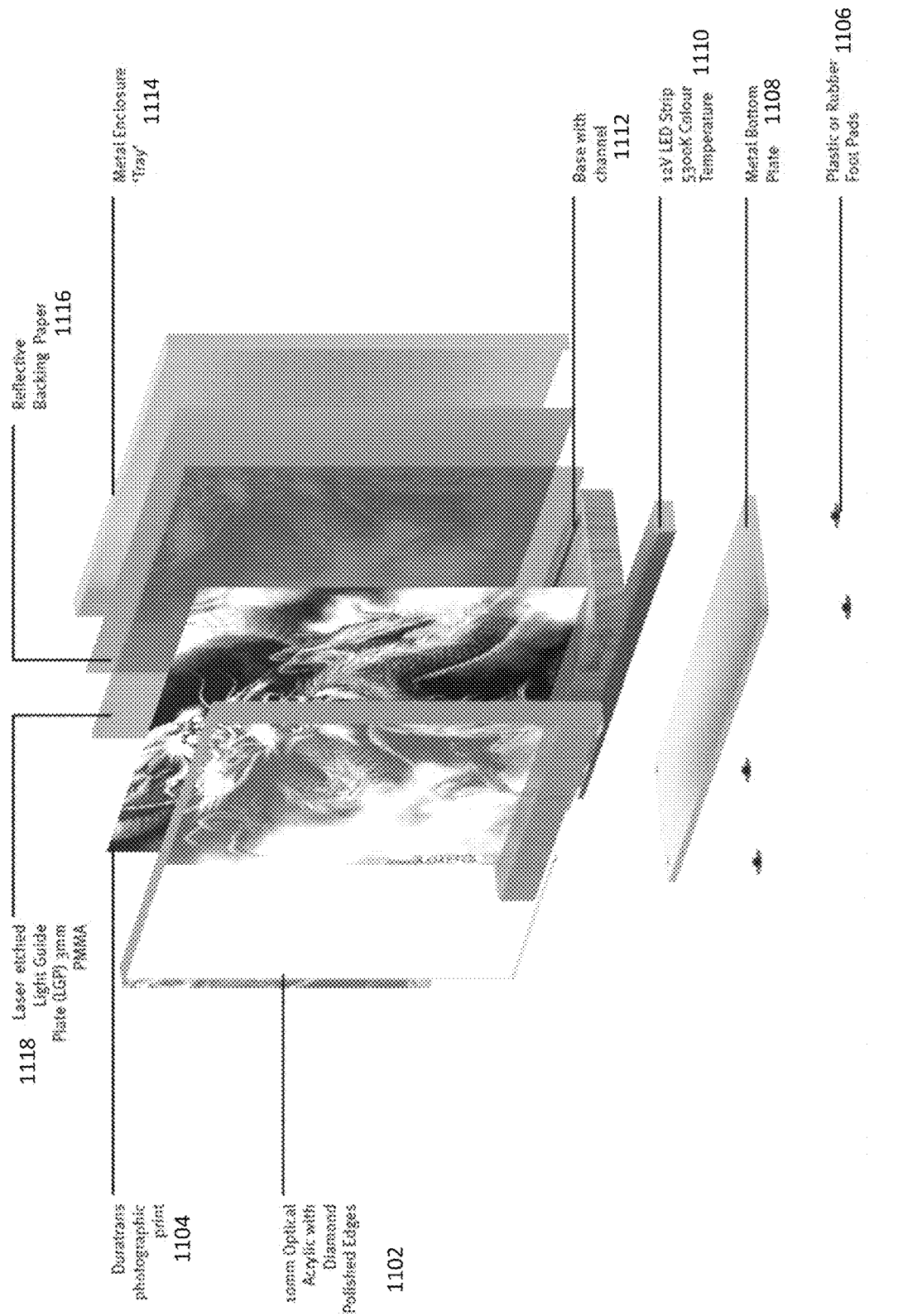
FIG. 11 illustrates an example exploded view of a BASELAMP, according to some embodiments.

FIG. 11 illustrates an example exploded view 1100 of a BASELAMP, according to some embodiments. View 1100 includes optical acrylic 1102. Optical acrylic 1102 can include diamond polished edges. In one example, optical acrylic 1102 can be 10 mm in thickness. A DURATRANS (or other formatted backlit graphic substrates, imaged in a variety of ways including photochemical and various types of inkjets) photographic print 1104 can be located between optical acrylic 1102 and light guide plate (LGP) 1118. LGP 1106 can be Laser etched. In example, LGP 1118 can be of PMMA that is 3 mm in thickness. Reflective backing paper 1116 and metal enclosure tray 1114 can be placed behind LGP 1106 as shown.

These plates can be coupled with a base 1112 (e.g. using a channel). Base 1112 can include an LED strip 1110. LED strip 1110 can be a 12V LED strip 5300k color/temperature. Base 1112 can also include 1108 metal bottom plate 1108 and foot pads 1106. Example foot pads 1106 can be comprised of rubber or plastic.

FIG. 12 illustrates an alternative example process 1200 for image-compression insertion with a BASELAMP, according to some embodiments. Process 1200 can use a DONGBU LIGHTEC LUMISHEET® product into a two-part compression fitting system. In this way, craftsmen can develop custom bases for BASELAMPS by cutting the opening for a BASELAMP framing system to insert into a customized base. Process 1200 can create a compression or click in fitting that allows the framing system to be embedded into wood, stone, metal and other base materials.

In step 1202, the DONGBU LUMISHEET sits within the metal tray and the bottom 'plug' system clicks everything together into a sturdy and upright system. In step 1204, the image and the optical acrylic block fit into the metal tray with a compression fitting. The optical acrylic does not overlap the plug. In step 1206, the assembled system slips downward into a routed opening with rounded corners. It is locked into place with a compression fit. FIG. 13 illustrates an example representation of process 1200, according to some embodiments.

Figure 14:
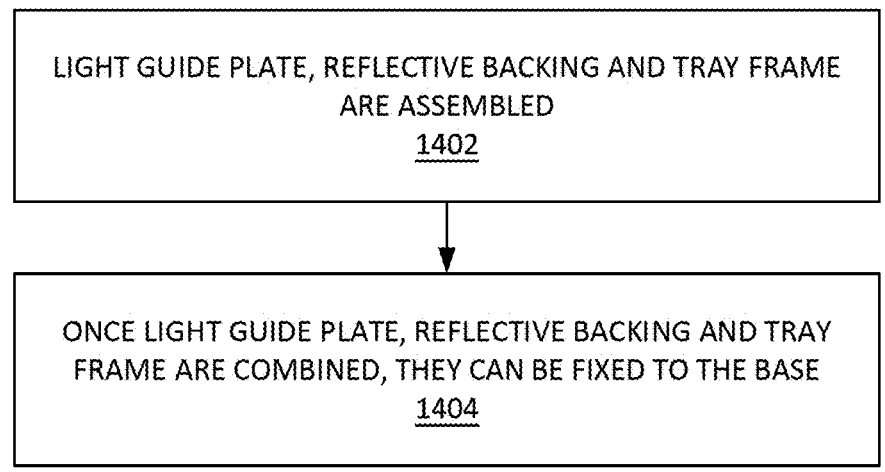
FIG. 14 illustrate an example process for assembling a BASELAMP, according to some embodiments.

FIG. 14 illustrate an example process 1400 for assembling a BASELAMP, according to some embodiments. In step 1402, the light guide plate, reflective backing and tray frame are assembled as illustrated. In step 1404, once the light guide plate, reflective backing and tray frame are combined, they can be fixed to the base.

Figure 15:
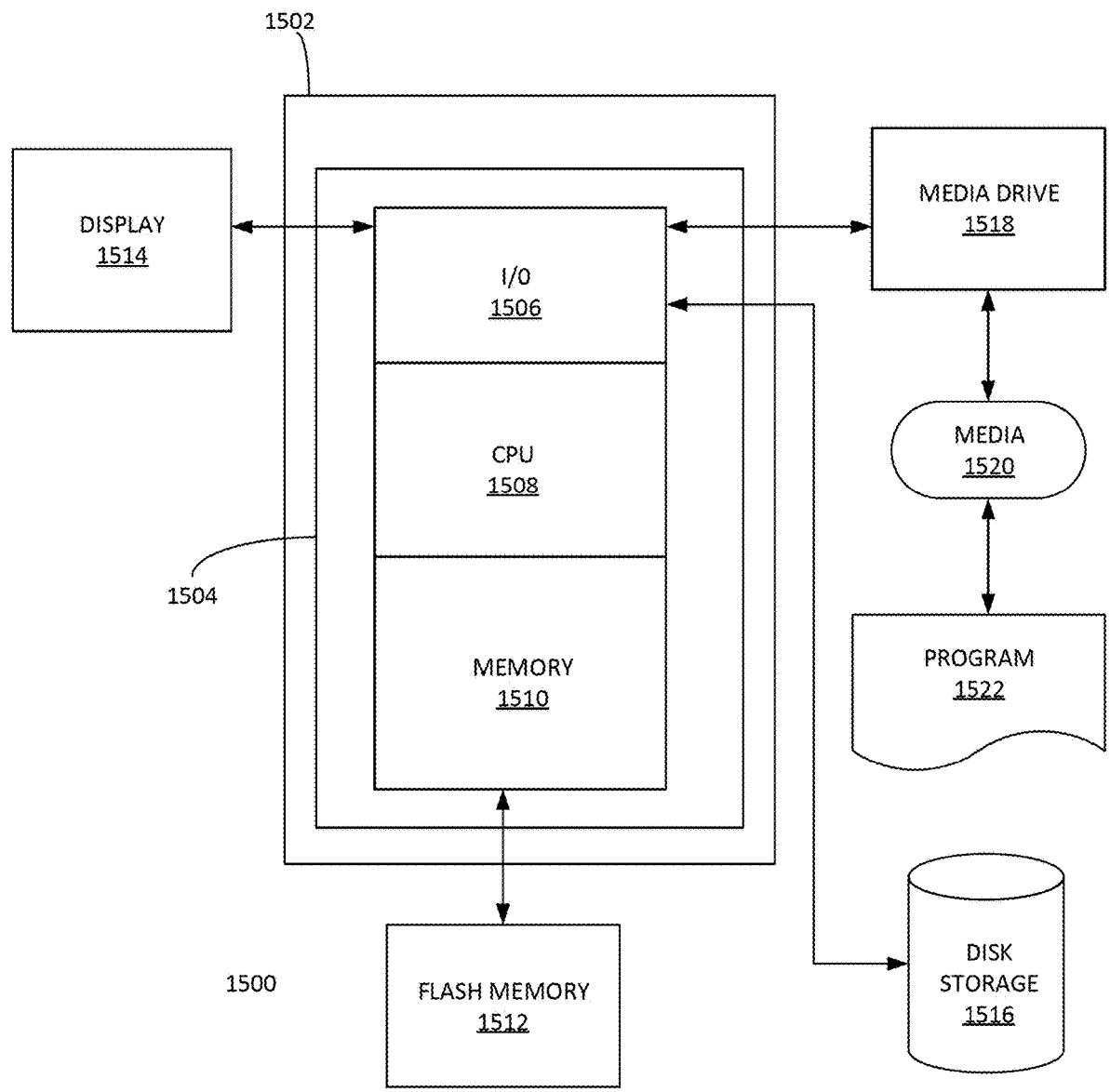
FIG. 15 is a block diagram of a sample computing environment that can be utilized to implement various embodiments.

FIG. 15 depicts an exemplary computing system 1500 that can be configured to perform any one of the processes provided herein. In this context, computing system 1500 may include, for example, a processor, memory, storage, and I/O devices (e.g., monitor, keyboard, disk drive, Internet connection, etc.). However, computing system 1500 may include circuitry or other specialized hardware for carrying out some or all aspects of the processes. In some operational settings, computing system 1500 may be configured as a system that includes one or more units, each of which is configured to carry out some aspects of the processes either in software, hardware, or some combination thereof.

FIG. 15 depicts computing system 1500 with a number of components that may be used to perform any of the processes described herein. The main system 1502 includes a motherboard 1504 having an I/O section 1506, one or more central processing units (CPU) 1508, and a memory section 1510, which may have a flash memory card 1512 related to it. The I/O section 1506 can be connected to a display 1514, a keyboard and/or other user input (not shown), a disk storage unit 1516, and a media drive unit 1518. The media drive unit 1518 can read/write a computer-readable medium 1520, which can contain programs 1522 and/or data. Computing system 1500 can include a web browser. Moreover, it is noted that computing system 1500 can be configured to include additional systems in order to fulfill various functionalities. Computing system 1500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A back-lit digital photograph frame system comprising:
A display assembly comprising:
a tray frame comprising a back surface of the display assembly as a backside enclosure,
an optical acrylic block comprising a front surface of the display assembly,
a light guide plate, wherein the light guide plate is located between a photographic print and a reflective backing paper,
the photographic print, wherein the photographic print is located between optical acrylic block and the light guide plate, and
a reflective backing paper, wherein the reflective back paper is located between the light guide plate and the tray frame,
wherein the tray frame, the optical acrylic block, the light guide plate, the photographic print and the reflective backing paper are set in a vertical stack, and
a base mount comprising an opening that receives the display assembly and holds the display assembly in a vertical position orthogonal to a receiving surface of the base mount, wherein the display assembly is held in place with a compression fit provided by the base mount, and wherein the base mount further comprises a light emitting diode (LED) strip.

2. The back-lit digital photograph frame system of claim 1, wherein the optical acrylic block comprises a diamond polished optical acrylic block.

3. The back-lit digital photograph frame system of claim 2, wherein the opening of the base mount comprising a routed opening with rounded corners.

4. The back-lit digital photograph frame system of claim 3, wherein the basement comprises a metal bottom plate and four-foot pads on a bottom surface of the metal bottom plate.

5. The back-lit digital photograph frame system of claim 4, wherein the LED strip comprises a twelve-volt (12V) LED strip.

6. The back-lit digital photograph frame system of claim 5, wherein the 12V LED strip comprises a 5300k color/temperature 12V LED strip.

7. The back-lit digital photograph frame system of claim 6, wherein the optical acrylic block is ten millimeters (10 mm) in thickness.

8. The back-lit digital photograph frame system of claim 7, wherein the photographic print comprises a formatted backlit graphic substrate.

9. The back-lit digital photograph frame system of claim 8, wherein the formatted backlit graphic substrate of the photographic print comprises a DURATRANS film substrate.

10. The back-lit digital photograph frame system of claim 9, wherein the base mount comprises an ambient light sensors and an audio systems.

11. The back-lit digital photograph frame system of claim 10, wherein the base mount comprises a motion-detection system and an audio sensors.

12. The back-lit digital photograph frame system of claim 11, wherein the base mount comprises at least one smart speakers, a wireless charging system, and a wireless networking system.

13. The back-lit digital photograph frame system of claim 12, wherein the opening that receives the display assembly and holds the display assembly in a vertical position orthogonal to a receiving surface of the base mount comprises a channel to the LED strip.

* * * * *